United States Patent
Busaba et al.

(10) Patent No.: US 12,020,059 B2
(45) Date of Patent: Jun. 25, 2024

(54) INACCESSIBLE PREFIX PAGES DURING VIRTUAL MACHINE EXECUTION

(71) Applicant: INTERNATIONAL BUSINESS MACHINES CORPORATION, Armonk, NY (US)

(72) Inventors: Fadi Y. Busaba, Poughkeepsie, NY (US); Lisa Cranton Heller, Rhinebeck, NY (US); Janosch Andreas Frank, Stuttgart (DE); Christian Borntraeger, Stuttgart (DE); Jonathan D. Bradbury, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 368 days.

(21) Appl. No.: 17/460,886

(22) Filed: Aug. 30, 2021

(65) Prior Publication Data
US 2023/0061511 A1    Mar. 2, 2023

(51) Int. Cl.
G06F 9/455    (2018.01)
G06F 9/48     (2006.01)

(52) U.S. Cl.
CPC ...... *G06F 9/45558* (2013.01); *G06F 9/45545* (2013.01); *G06F 9/4812* (2013.01); *G06F 2009/45575* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 4,400,769 A * | 8/1983 | Kaneda | G06F 9/4843 710/267 |
| 9,075,644 B2 | 7/2015 | Hall et al. | |
| 9,575,125 B1 * | 2/2017 | Andre | G11C 29/10 |
| 9,575,790 B2 | 2/2017 | Tosa et al. | |
| 10,191,861 B1 * | 1/2019 | Steinberg | G06F 21/56 |
| 10,395,029 B1 * | 8/2019 | Steinberg | G06F 21/53 |
| 10,447,728 B1 * | 10/2019 | Steinberg | H04L 63/10 |

(Continued)

FOREIGN PATENT DOCUMENTS

| | | |
|---|---|---|
| CN | 103959247 A | 7/2014 |
| EP | 3367287 B1 | 3/2020 |
| TW | I575362 B | 3/2017 |

OTHER PUBLICATIONS

Notification of Transmittal of the International Search Report and the Written Opinion of the International Searching Authority, PCT/EP2022/073696, Nov. 30, 2022, 11 pages.

(Continued)

*Primary Examiner* — Adam Lee
(74) *Attorney, Agent, or Firm* — Edward J. Wixted, III; Blanche E. Schiller, Esq.; Heslin Rothenberg Farley & Mesiti P.C.

(57) ABSTRACT

A virtual machine is dispatched and based on the dispatch, a determination is made as to whether a select area of memory expected to be accessible to the virtual machine and used in communication between the virtual machine and an operating system is accessible to the virtual machine. Based on determining that the select area of memory is inaccessible to the virtual machine, virtual machine execution is exited with a select interception code.

25 Claims, 10 Drawing Sheets

(56) References Cited

U.S. PATENT DOCUMENTS

| | | |
|---|---|---|
| 10,599,489 B2 | 3/2020 | Bacher et al. |
| 10,635,479 B2* | 4/2020 | Lutas .................... G06F 9/542 |
| 10,838,755 B2 | 11/2020 | Bacher et al. |
| 10,956,188 B2 | 3/2021 | Busaba et al. |
| 2003/0229794 A1* | 12/2003 | Sutton, II ............ G06F 12/1491 |
| | | 713/189 |
| 2005/0102671 A1* | 5/2005 | Baumberger ........... G06F 9/546 |
| | | 718/1 |
| 2005/0223377 A1* | 10/2005 | Galal ................. G06F 9/45533 |
| | | 718/1 |
| 2006/0224815 A1* | 10/2006 | Yamada .................. G06F 12/10 |
| | | 711/6 |
| 2008/0082881 A1* | 4/2008 | Szydlowski ........... G06F 11/24 |
| | | 714/E11.154 |
| 2008/0244324 A1* | 10/2008 | Schmelter ........... G06F 11/0769 |
| | | 714/38.14 |
| 2008/0288940 A1* | 11/2008 | Adams ................ G06F 9/45558 |
| | | 718/1 |
| 2008/0307213 A1* | 12/2008 | Sekiguchi ........... G06F 9/45558 |
| | | 713/1 |
| 2009/0089527 A1* | 4/2009 | Schoenberg ........ G06F 9/45558 |
| | | 711/E12.091 |
| 2009/0172343 A1* | 7/2009 | Savagaonkar .......... G06F 9/461 |
| | | 711/E12.059 |
| 2009/0210680 A1* | 8/2009 | Farrell .................. G06F 9/3861 |
| | | 712/E9.016 |
| 2009/0327648 A1* | 12/2009 | Savagaonkar ........ G06F 12/145 |
| | | 711/207 |
| 2011/0131443 A1* | 6/2011 | Laor .................... G06F 11/0751 |
| | | 718/1 |
| 2011/0185158 A1* | 7/2011 | Alexander ............ G06F 9/3838 |
| | | 712/E9.016 |
| 2011/0202747 A1* | 8/2011 | Busaba ................. G06F 9/3017 |
| | | 712/205 |
| 2011/0276764 A1* | 11/2011 | Alexander .......... G06F 9/30149 |
| | | 712/226 |
| 2013/0086299 A1 | 4/2013 | Epstein |
| 2013/0132420 A1 | 5/2013 | Vainer et al. |
| 2013/0326179 A1* | 12/2013 | Tsirkin .................. G06F 9/5016 |
| | | 711/163 |
| 2013/0339656 A1* | 12/2013 | Greiner ............... G06F 12/1009 |
| | | 711/207 |
| 2014/0283056 A1* | 9/2014 | Bachwani ........... G06F 9/45558 |
| | | 726/23 |
| 2015/0121366 A1* | 4/2015 | Neiger .................. G06F 9/4555 |
| | | 718/1 |
| 2015/0268979 A1* | 9/2015 | Komarov ............ G06F 9/45533 |
| | | 711/145 |
| 2015/0277908 A1 | 10/2015 | Bradbury et al. |
| 2015/0370724 A1* | 12/2015 | Lutas .................. G06F 12/1483 |
| | | 711/163 |
| 2016/0034300 A1* | 2/2016 | Fukushima ......... G06F 9/45533 |
| | | 718/1 |
| 2016/0048458 A1* | 2/2016 | Lutas ...................... G06F 21/53 |
| | | 711/163 |
| 2016/0048680 A1* | 2/2016 | Lutas .................. G06F 9/45558 |
| | | 726/23 |
| 2016/0085568 A1 | 3/2016 | Dupre et al. |
| 2016/0098330 A1* | 4/2016 | Mu ....................... G06F 3/0619 |
| | | 714/6.23 |
| 2016/0188354 A1* | 6/2016 | Goldsmith .......... G06F 12/1009 |
| | | 718/1 |
| 2016/0210069 A1* | 7/2016 | Lutas .................... G06F 3/0637 |
| 2016/0246630 A1* | 8/2016 | Tsirkin ................. H04L 63/104 |
| 2016/0350145 A1* | 12/2016 | Botzer ................ G06F 9/45558 |
| 2017/0039371 A1* | 2/2017 | Lukacs .................. G06F 21/564 |
| 2017/0180318 A1* | 6/2017 | Lutas ...................... H04L 63/14 |
| 2017/0185430 A1 | 6/2017 | Gainey, Jr. et al. |
| 2017/0192810 A1* | 7/2017 | Lukacs .................... G06F 21/56 |
| 2017/0220466 A1* | 8/2017 | Gupta .................... G06F 12/084 |
| 2017/0279805 A1* | 9/2017 | Diaz-Cuellar .......... H04L 63/20 |
| 2017/0286673 A1* | 10/2017 | Lukacs ................. G06F 21/566 |
| 2017/0344393 A1 | 11/2017 | Ansari et al. |
| 2018/0004562 A1* | 1/2018 | Huntley ................. G06F 9/3004 |
| 2018/0004943 A1* | 1/2018 | Lukacs .................... G06F 9/542 |
| 2018/0074969 A1* | 3/2018 | Neiger ................ G06F 12/1009 |
| 2018/0173555 A1* | 6/2018 | Lutas ...................... G06F 21/53 |
| 2019/0044971 A1* | 2/2019 | Sukhomlinov ...... G06F 9/45558 |
| 2019/0370044 A1* | 12/2019 | Tsirkin .................. G06F 12/109 |
| 2020/0050364 A1* | 2/2020 | Gilbert ................ G06F 9/45558 |
| 2020/0167180 A1* | 5/2020 | Tsirkin .................. G06F 9/4856 |
| 2020/0241902 A1* | 7/2020 | Freche ................ G06F 9/45545 |
| 2020/0241906 A1* | 7/2020 | Tsirkin ................. G06F 12/1441 |
| 2020/0285494 A1* | 9/2020 | Busaba ................. G06F 21/606 |
| 2020/0285495 A1 | 9/2020 | Imbrenda et al. |
| 2020/0285500 A1 | 9/2020 | Busaba et al. |
| 2020/0285747 A1 | 9/2020 | Borntraeger |
| 2020/0334062 A1* | 10/2020 | Tsirkin ................ G06F 9/45533 |
| 2020/0341797 A1* | 10/2020 | Tsirkin ................... G06F 3/0647 |
| 2021/0263762 A1 | 8/2021 | Kachare et al. |
| 2021/0407615 A1* | 12/2021 | Manning ................. G11C 29/18 |
| 2022/0269521 A1* | 8/2022 | Tsirkin ................ G06F 9/45558 |
| 2022/0405111 A1* | 12/2022 | Tsirkin ................. G06F 12/1081 |

OTHER PUBLICATIONS

IBM, "z/Architecture—Principles of Operation," IBM Publication No. SA22-7832-12, Thirteenth Edition, Sep. 2019, pp. 1-2000.

Mell, Peter and Tim Grance, "The NIST Definition of Cloud Computing," National Institute of Standards and Technology, Information Technology Laboratory, Special Publication 800-145, Sep. 2011, pp. 1-7.

Communication Pursuan tto Rules 161(1) and 162 EPC, Application No. 22769224.1-1203, Apr. 9, 2024, pp. 1-3.

* cited by examiner

DETERMINE, BASED ON DISPATCH OF A VIRTUAL MACHINE, WHETHER A SELECT AREA OF MEMORY EXPECTED TO BE ACCESSIBLE AND USED IN COMMUNICATION BETWEEN THE VIRTUAL MACHINE AND AN OPERATING SYSTEM IS ACCESSIBLE TO THE VIRTUAL MACHINE — 400

EXIT VIRTUAL MACHINE EXECUTION WITH A SELECT INTERCEPTION CODE, BASED ON DETERMINING THAT THE SELECT AREA OF MEMORY IS INACCESSIBLE TO THE VIRTUAL MACHINE — 402

EXECUTE ONE OR MORE GUEST INSTRUCTIONS OF THE VIRTUAL MACHINE, BASED ON DETERMINING THAT THE SELECT AREA OF MEMORY IS ACCESSIBLE TO THE VIRTUAL MACHINE — 404

BASED ON DETERMINING THAT THE SELECT AREA OF MEMORY IS ACCESSIBLE:

DETERMINE FOR A GUEST INSTRUCTION OF THE VIRTUAL MACHINE WHETHER THERE IS TO BE ACCESS TO THE SELECT AREA OF MEMORY — 406

CHECK, BASED ON DETERMINING THAT THERE IS TO BE ACCESS, WHETHER THE ACCESS IS AN EXPLICIT ACCESS OR AN IMPLICIT ACCESS — 408

PERFORM ONE OR MORE ACTIONS BASED ON WHETHER THE ACCESS IS THE EXPLICIT ACCESS OR THE IMPLICIT ACCESS — 410

BASED ON THE ACCESS BEING THE IMPLICIT ACCESS, THE ONE OR MORE ACTIONS INCLUDE: — 412

DETERMINING A REASON FOR THE IMPLICIT ACCESS — 414

PERFORMING ONE OR MORE SELECT ACTIONS, BASED ON THE REASON FOR THE IMPLICIT ACCESS — 416

FIG. 4A

BASED ON THE REASON FOR THE IMPLICIT ACCESS BEING AN ASYNCHRONOUS INTERRUPT, THE ONE OR MORE SELECT ACTIONS INCLUDE: ~420

PERFORMING A PRE-TEST OF THE SELECT AREA OF MEMORY ~422

DETERMINING WHETHER AN EXCEPTION OCCURRED DURING THE PRE-TEST OF THE SELECT AREA OF MEMORY ~424

BASED ON DETERMINING THAT THE EXCEPTION OCCURRED DURING THE PRE-TEST OF THE SELECT AREA OF MEMORY, KEEPING THE ASYNCHRONOUS INTERRUPT PENDING IN THE VIRTUAL MACHINE AND EXITING TO A HOST OF THE VIRTUAL MACHINE WITH THE SELECT INTERCEPTION CODE ~426

BASED ON THE REASON FOR THE IMPLICIT ACCESS BEING A PROGRAM INTERRUPT, THE ONE OR MORE SELECT ACTIONS INCLUDE: ~430

DETERMINING WHETHER THE PROGRAM INTERRUPT IS TO ACCESS THE SELECT AREA OF MEMORY ~432

PERFORMING A PRE-TEST OF THE SELECT AREA OF MEMORY, BASED ON DETERMINING THAT THE PROGRAM INTERRUPT IS TO ACCESS THE SELECT AREA OF MEMORY ~434

DETERMINING WHETHER AN EXCEPTION OCCURRED DURING THE PRE-TEST OF THE SELECT AREA OF MEMORY ~436

PERFORMING PROCESSING BASED ON WHETHER THE EXCEPTION OCCURRED DURING THE PRE-TEST OF THE SELECT AREA OF MEMORY ~438

FIG. 4B

THE PERFORMING PROCESSING INCLUDES CONTINUING WITH INSTRUCTION PROCESSING, BASED ON DETERMINING THAT THE EXCEPTION DID NOT OCCUR DURING THE PRE-TEST OF THE SELECT AREA OF MEMORY — 440

THE PERFORMING PROCESSING INCLUDES BASED ON DETERMINING THAT THE EXCEPTION DID OCCUR DURING THE PRE-TEST OF THE SELECT AREA OF MEMORY:

CHECKING WHETHER THE GUEST INSTRUCTION IS EXECUTED AS PART OF TRANSACTIONAL EXECUTION — 442

BASED ON THE CHECKING INDICATING THAT THE GUEST INSTRUCTION IS EXECUTED AS PART OF TRANSACTIONAL EXECUTION, EXITING VIRTUAL MACHINE EXECUTION WITH THE SELECT INTERCEPTION CODE AND ABNORMALLY TERMINATING TRANSACTIONAL EXECUTION — 444

BASED ON THE CHECKING INDICATING THAT THE GUEST INSTRUCTION IS NOT EXECUTED AS PART OF TRANSACTIONAL EXECUTION, DETERMINING A TYPE OF THE EXCEPTION AND PERFORMING ONE OR MORE CHOSEN ACTIONS BASED ON THE TYPE OF THE EXCEPTION — 446

BASED ON THE TYPE OF EXCEPTION BEING A NULLIFYING OR SUPPRESSION EXCEPTION, THE ONE OR MORE CHOSEN ACTIONS INCLUDE NULLIFYING THE GUEST INSTRUCTION — 448

BASED ON THE TYPE OF EXCEPTION BEING A COMPLETION OR EARLY SPECIFICATION EXCEPTION, THE ONE OR MORE CHOSEN ACTIONS INCLUDE: — 450

SAVING INTERRUPT INFORMATION IN A SECURE LOCATION — 452

LOCKING THE VIRTUAL MACHINE FOR EXCEPTION — 454

EXITING VIRTUAL MACHINE EXECUTION WITH THE SELECT INTERCEPTION CODE — 456

EXAMINE A LOCK OF THE VIRTUAL MACHINE AT A NEXT ENTRY OF THE VIRTUAL MACHINE — 458

COMPLETE PROGRAM EXCEPTION HANDLING BASED ON THE LOCK BEING SET VIA THE LOCKING — 460

FIG. 4C

INACCESSIBLE PREFIX PAGES DURING VIRTUAL MACHINE EXECUTION

BACKGROUND

One or more aspects relate, in general, to facilitating processing within a computing environment, and in particular, to improving such processing.

Computing environments often have a select area of memory to be used by the machine or programs to communicate with the operating system. This area of memory may be referred to as prefix pages and, in one example, includes 8K (kilobytes) of memory. The memory is defined as real memory and dynamic translation is not required for access. These pages contain a series of predefined assigned storage locations. Each virtual processor within the operating system configuration has a unique prefix value. This prefix value maps the assigned real storage location to an absolute address which is used only by that processor. The pages of memory can be explicitly or implicitly accessed during the execution of a program. Explicit access occurs due to execution of certain instructions, like a Supervisor Call or Store Facility List instruction defined, for instance, in the z/Architecture® instruction set architecture offered by International Business Machines Corporation. Implicit access occurs due to conditions outside the scope of instruction execution, and includes, for instance, architected interrupts, such as machine checks, external interrupts, input/output (I/O) interrupts, etc., or program interrupts encountered during execution of instructions, as a side affect of stores, or due to an abnormal termination of a transaction.

For example, for the case where a program exception is detected by the machine, the machine stores information about the program exception in the prefix pages. This information includes the current program status word (PSW) and instruction address of the program that is running (referred to as the program old PSW), the type of program exception (program interruption code) that occurred, and information about the exception, such as a memory address, addressing modes, etc. In addition, the machine obtains the program status word and instruction address of the software program interruption handler (a.k.a., program new PSW) and uses it to begin execution of a program interruption handler in the operating system. After handling the program exception, the operating system will restore the program old PSW and resume execution of the original program. Further, in one example, a guest prefix page is also stored into with diagnostic information when the guest encounters a memory transaction.

In computing environments that support virtualization, the prefix pages of the virtual machines (guests) are mapped and made accessible to the virtual machines. For a virtual machine running as a guest of a hypervisor (or host), although the guest prefix pages are accessed as real pages, there may be a hypervisor translation that provides virtualization at the hypervisor level and maps the guest real pages to host absolute storage.

In a typical hypervisor implementation, the prefix pages of a virtual machine are known to the hypervisor. The hypervisor has the responsibility of pinning these pages in memory and keeping their host translation valid for the duration of the guest execution. The pinning of the prefix pages for the virtual machines is cumbersome to the hypervisor since it becomes difficult to alter its memory management scheme to avoid paging out the guest prefix pages. Execution of a secure virtual machine further complicates the memory management of the hypervisor. In this case, for security reasons, even when the prefix pages are still mapped from dynamic hardware translation, the hypervisor can no longer access the prefix pages belonging to a secure guest. This prevents a non-trusted hypervisor from affecting and accessing guest data.

Processing associated with virtual machines, including secure virtual machines, and the use of prefix pages is to be facilitated.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes determining, based on dispatch of a virtual machine, whether a select area of memory expected to be accessible to the virtual machine and used in communication between the virtual machine and an operating system is accessible to the virtual machine. Based on determining that the select area of memory is inaccessible to the virtual machine, virtual machine execution is exited with a select interception code. This facilitates processing by preventing guest instruction execution if the select area of memory, expected to be accessible, is inaccessible.

In one example, based on determining that the select area of memory is accessible to the virtual machine, one or more guest instructions of the virtual machine are executed.

In one example, based on determining that the select area of memory is accessible, a determination is made for a guest instruction of the virtual machine whether there is to be access to the select area of memory. Based on determining that there is to be access, a check is made as to whether the access is an explicit access or an implicit access. Based on whether the access is the explicit access or the implicit access, one or more actions are performed.

The select area of memory, expected to be accessible, is once again checked for accessibility to facilitate processing. One or more aspects handle a situation in which the hypervisor can no longer keep the select area of memory (e.g., prefix page(s)) of a guest (e.g., a virtual machine) pinned for the duration of guest execution.

As an example, based on the access being the implicit access, the one or more actions include, for instance, determining a reason for the implicit access and performing one or more select actions, based on the reason for the implicit access.

In one example, based on the reason for the implicit access being an asynchronous interrupt, the one or more select actions include, for instance, performing a pre-test of the select area of memory and determining whether an exception occurred during the pre-test of the select area of memory. As an example, based on determining that the exception occurred during the pre-test of the select area of memory, the asynchronous interrupt is kept pending in the virtual machine and there is an exit to a host of the virtual machine with the select interception code.

In one example, based on the reason for the implicit access being a program interrupt, the one or more select actions include determining whether the program interrupt is to access the select area of memory and performing a pre-test of the select area of memory, based on determining that the program interrupt is to access the select area of memory. A determination is made, in one example, as to whether an exception occurred during the pre-test of the select area of memory, and processing is performed based on whether the exception occurred during the pre-test of the select area of memory.

In one example, the performing processing includes continuing with instruction processing, based on determining that the exception did not occur during the pre-test of the select area of memory. In one example, based on determining that the exception did occur during the pre-test of the select area of memory, the performing processing includes checking whether the guest instruction is executed as part of transactional execution. Based on the checking indicating that the guest instruction is executed as part of transactional execution, virtual machine execution is exited with the select interception code and transactional execution is abnormally terminated. In one example, based on the checking indicating that the guest instruction is not executed as part of transactional execution, a type of the exception is determined, and one or more chosen actions are performed based on the type of the exception.

As an example, based on the type of exception being a nullifying or suppression exception, the one or more chosen actions include nullifying the guest instruction. Further, in one example, based on the type of exception being a completion or early specification exception, the one or more chosen actions include saving interrupt information in a secure location, locking the virtual machine for exception, and exiting virtual machine execution with the select interception code.

In one example, a lock of the virtual machine is examined at a next entry of the virtual machine, and program exception handling is completed based on the lock being set via the locking.

Processing is facilitated by determining a cause/condition of an exit and performing actions based thereon.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 4A-4C depict one example of facilitating processing within a computing environment, in accordance with one or more aspects of the present invention;

DETAILED DESCRIPTION

In accordance with one or more aspects of the present invention, a capability is provided to facilitate processing within a computing environment. As an example, the capability includes selective processing to be performed during execution of a virtual machine based on accessibility of a select area of memory (e.g., prefix pages).

One embodiment of a computing environment to incorporate and use one or more aspects of the present invention is described with reference to FIG. 1. As an example, the computing environment is based on the z/Architecture® instruction set architecture, offered by International Business Machines Corporation, Armonk, New York One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Figure 1:
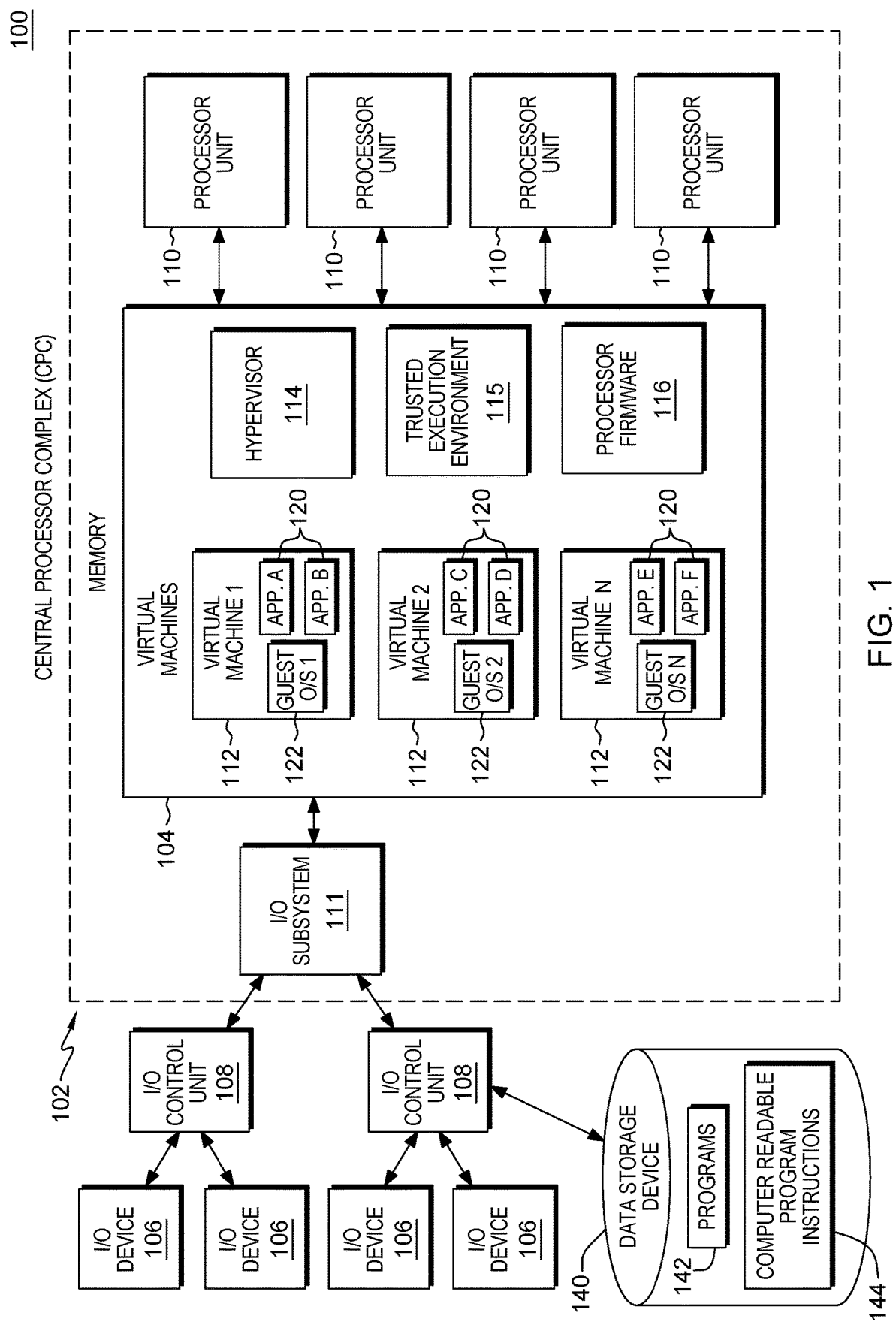
FIG. 1 depicts one example of a computing environment to incorporate and use one or more aspects of the present invention.

Referring to FIG. 1, in one example, a computing environment 100 includes a central processor complex (CPC) 102. Central processor complex 102 is, for instance, an IBM Z® server (or other server or machine offered by International Business Machines Corporation or other entities) and includes a plurality of components, such as, for instance, a memory 104 (a.k.a., system memory, main memory, main storage, central storage, storage) coupled to one or more processor units (also referred to as processors) 110 and to an input/output (I/O) subsystem 111. Example processor units 110 include one or more general-purpose processors (a.k.a., central processors or central processing units (CPUs)) and/or one or more other processors. IBM Z is a trademark or registered trademark of International Business Machines Corporation in at least one jurisdiction.

I/O subsystem 111 can be a part of the central processor complex or separate therefrom. It directs the flow of information between main storage 104 and input/output control units 108 and input/output (I/O) devices 106 coupled to the central processor complex.

Many types of I/O devices may be used. One particular type is a data storage device 140. Data storage device 140 can store one or more programs 142, one or more computer readable program instructions 144, and/or data, etc. The computer readable program instructions can be configured to carry out functions of embodiments of aspects of the invention.

Central processor complex 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode or millicode, device drivers, redundant processing units, external disk drive arrays, RAID systems, tape drives, and data archival storage systems, etc.

Further, central processor complex 102 can be operational with numerous other general-purpose or special-purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Central processor complex 102 provides, in one or more embodiments, virtualization support, in which memory 104 includes, for example, one or more virtual machines 112 (also referred to as guests), a virtual machine manager, such as a hypervisor 114, that manages the virtual machines, a trusted execution environment 115 and processor firmware 116. One example of hypervisor 114 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

In one or more embodiments, trusted execution environment 115 may be implemented, at least in part, in hardware and/or firmware configured to perform, for instance, processes such as described herein. The trusted execution environment is trusted firmware (which may also be referred to as an ultravisor) and/or hardware that makes use of memory-protection hardware to enforce memory protection. The owner of a guest can securely pass information (using, e.g., IBM Secure Execution) to the trusted execution environment by using a public host key, which is embedded in a host key document. To process the confidential information, the trusted execution environment uses a matching private host key. The private host key is specific to the server, e.g., the IBM Z® server, and is hardware protected.

Processor firmware 116 includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

The virtual machine support of the central processor complex provides the ability to operate large numbers of virtual machines 112, each capable of operating with different programs 120 and running a guest operating system 122, such as the Linux® operating system. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

In one embodiment, one or more virtual machines 112 are secure virtual machines. A secure virtual machine is started by a hypervisor (e.g., hypervisor 114) in a manner that the hypervisor cannot observe the state (e.g., memory, registers, etc.) of the secure virtual machine. For instance, in one embodiment of confidential computing, the hypervisor can start/stop a secure virtual machine, and the hypervisor knows where data used to start the secure virtual machine is located but it cannot look into the running secure virtual machine. Data used to load/start the secure virtual machine may be encrypted in a manner that the hypervisor cannot see the secure machine. The owner of the secure virtual machine image places confidential data in the secure guest metadata and then generates a secure virtual machine image together with the secure guest metadata. After the secure virtual machine is loaded, any interaction with the state of the secure virtual machine is processed by a trusted execution environment, such as trusted execution environment 115.

Figure 2:
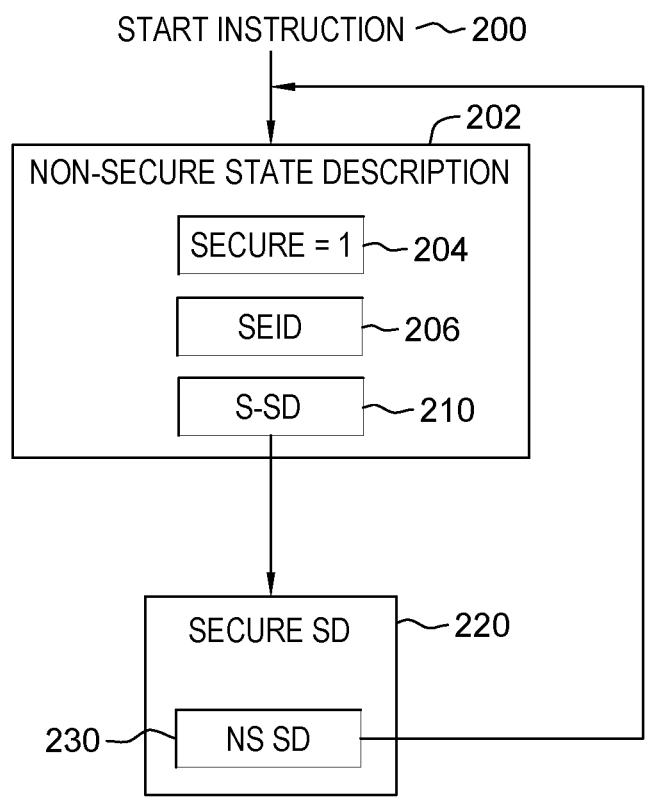
FIG. 2 depicts one example of control blocks used in starting a virtual machine, including a secure virtual machine, in accordance with one or more aspects of the present invention.

In one example, referring to FIG. 2, to start a secure virtual machine, the hypervisor (e.g., hypervisor 114) issues a start virtual machine instruction 200, such as a start interpretive execution instruction, which is executed by the trusted entity, e.g., the ultravisor. As an example, start virtual machine instruction 200 includes an operand that points to a control block, e.g., a non-secure state description 202, that includes an interface between the host (e.g., hypervisor 114) and a virtual machine. As an example, non-secure state description 202 includes a secure indicator 204 that indicates whether the virtual machine being started is a secure virtual machine. For instance, if secure indicator 204 is set to, e.g., one, the virtual machine is a secure virtual machine (and if it is set to, e.g., zero, it is a non-secure virtual machine). Further, non-secure state description 202 includes a secure execution identification 206, and a pointer, referred to as a secure state description pointer 210 that points to another control block, a secure state description 220. Secure state description 220 includes confidential data of the secure virtual machine that is not to be seen by the hypervisor. In one example, secure state description 220 also includes a pointer 230 to non-secure state description 202. (If the virtual machine being started is a non-secure virtual machine, then, in one example, the secure state description is not pointed to or used.)

Based on executing the start virtual machine instruction for a secure virtual machine, the trusted entity loads the secure virtual machine into hardware and when the start instruction is complete, the virtual machine is running securely on the hardware. For the duration of execution of a virtual machine, secure or non-secure, the select area of memory (e.g., prefix pages) is to be accessible to the virtual machine. That is, the host mapping is valid, the associated host absolute address can be obtained, and the pages can be accessed. However, this cannot be assumed. Thus, checks during virtual machine execution are performed, and if the select area of memory is inaccessible, certain actions are taken. One embodiment of this processing is described with reference to FIGS. 3A-3B.

Figure 3A:
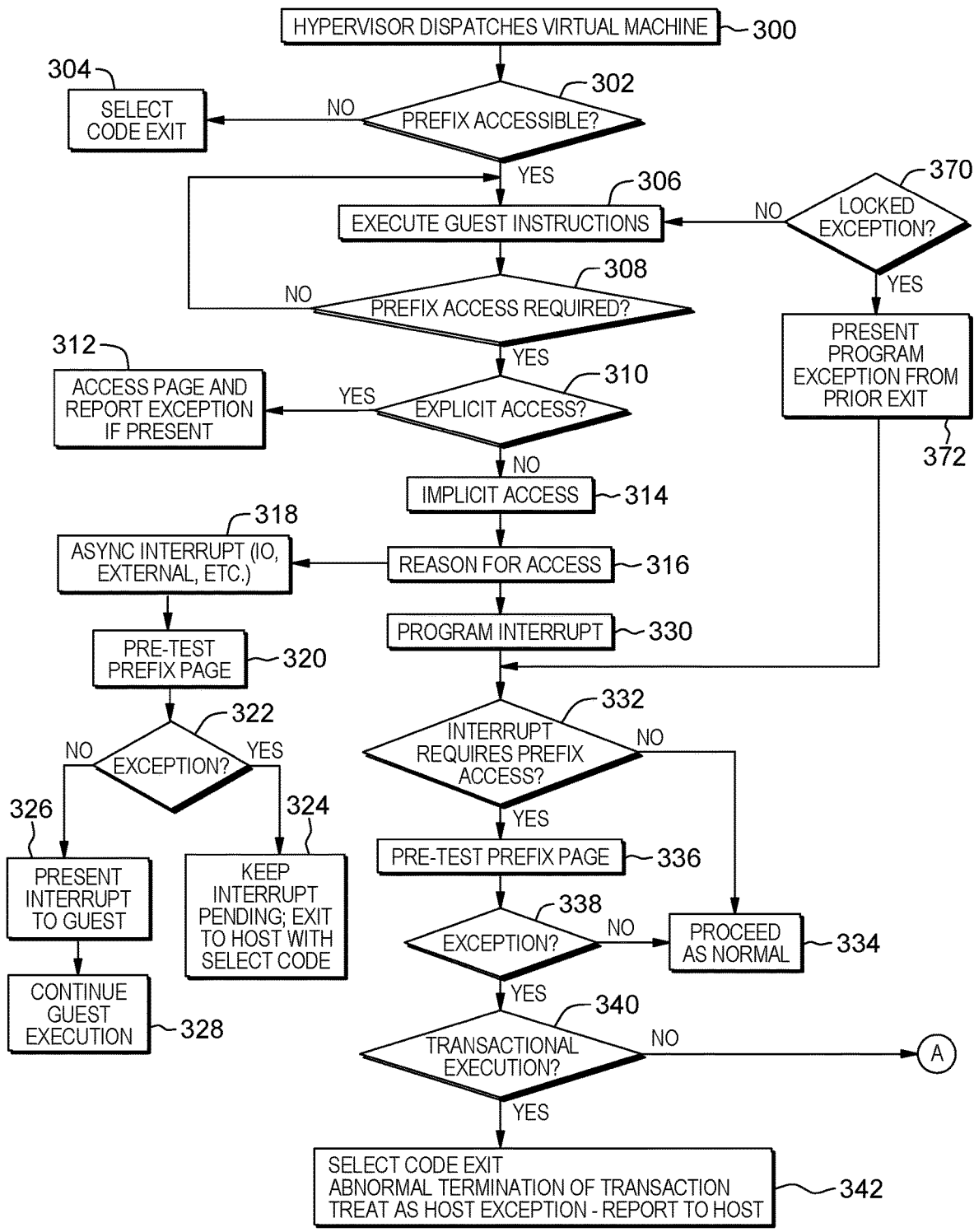
FIGS. 3A-3B depict one example of prefix access processing associated with execution of a virtual machine, in accordance with one or more aspects of the present invention.

In one example, referring to FIG. 3A, a hypervisor (e.g., hypervisor 114) dispatches a virtual machine 300. Based on the dispatch, in one example, processing is performed by a trusted entity (e.g., the ultravisor). For instance, a determination is made as to whether a select area of memory, which is expected to be accessible, is actually accessible. In one example, the select area of memory is the prefix pages, and therefore, a determination is made as to whether the prefix pages are accessible 302. If the prefix pages are inaccessible, then, in accordance with an aspect of the present invention, virtual machine execution exits with a select interception code (e.g., code 112) 304. However, if the prefix pages are accessible, then one or more guest instructions of the virtual machine may be executed 306.

During execution of the guest instructions, if the prefix pages are not to be accessed (e.g., prefix access not required) 308, then guest instruction processing continues. However, if the prefix pages are to be accessed 308, then a determination is made (e.g., by the trusted entity) as to whether the access is explicit 310. That is, is the access due to execution of a specific instruction. If the access is explicit, then the page is accessed and if an exception occurs during page access, the exception is reported 312. If, however, the access is an implicit access 314, then a determination is made (e.g., by the trusted entity) as to the reason for the access 316.

Should the reason for the access of the prefix pages be an asynchronous interrupt (e.g., an input/output interrupt, an external interrupt, etc.) 318, then a pre-test is made (e.g., by the trusted entity) of the prefix page(s) to be accessed 320. If the pre-test indicates an exception 322, then the interrupt is kept pending in the virtual machine, and there is a virtual machine exit to the host with the select interception code 324. If, however, there is no exception from the pre-test 322, then the asynchronous interrupt is presented to the virtual machine 326 and virtual machine execution continues 328.

Returning to 316, if the reason for the access is a program interrupt 330, then a further determination is made (e.g., by the trusted entity) as to whether the interrupt is to access the prefix pages (e.g., interrupt requires prefix access) 332. It the interrupt is not to access the prefix pages, then processing proceeds as normal 334. However, if the interrupt is to access the prefix pages 332, then a pre-test of the prefix page(s) to be used is performed (e.g., by the trusted entity) 336. Should there be no exception during the pre-test 338, then processing proceeds as normal 334. However, if there is an exception during the pre-test 338, a determination is made (e.g., by the trusted entity) as to whether the instruction is being executed as part of transactional execution (e.g., between a transaction begin and a transaction end instruction) 340. If the instruction is executed as part of transactional execution, then, in accordance with an aspect of the present invention, the virtual machine exits with the select interception code, the transaction is abnormally terminated and the exception is reported to the host (e.g., hypervisor) 342.

Figure 3B:
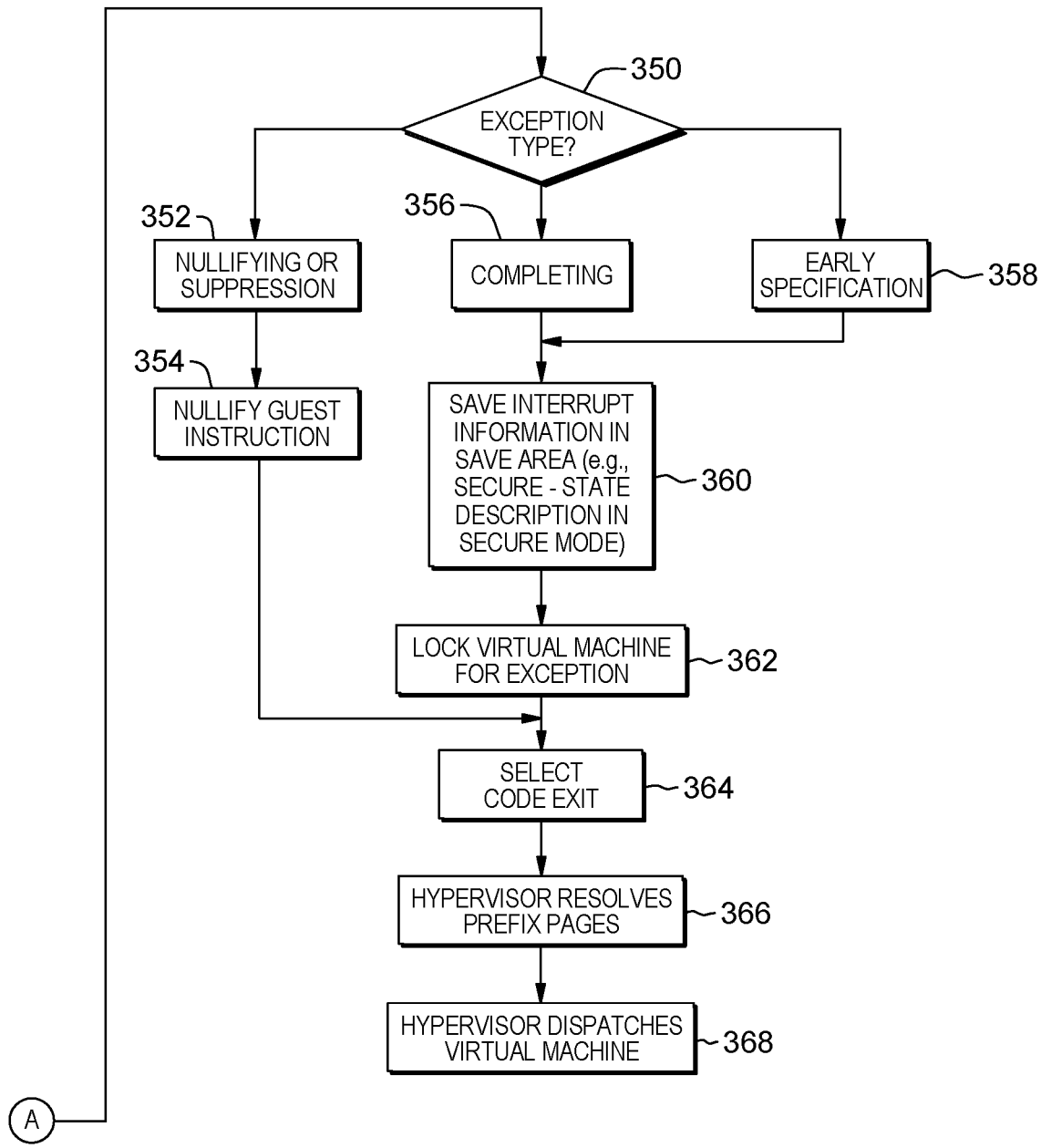

On the other hand, if the instruction is not being executed as part of transactional execution 340, then, referring to FIG. 3B, an inquiry is made (e.g., by the trusted entity) as to the type of exception 350. If the exception type is, for instance, nullifying or suppression 352, the guest instruction is nullified (e.g., by the trusted entity) 354 and the virtual machine exits with the select interception code 364. Thereafter, the hypervisor resolves the prefix pages 366 making them accessible and the virtual machine is re-dispatched by the hypervisor 368. Further, if the exception type is completing 356 or early specification 358, the interrupt information is saved (e.g., by the trusted entity) in a save area (e.g., a secure state description in secure mode) 360. This information includes, for instance, the program status word/instruction address of the currently running program, the type of program exception (program interrupt code), and information about the exception, such as a memory address, addressing modes, etc. (Additional, less and/or other information may be saved in other examples.) The virtual machine is locked (e.g., by the trusted entity) for the exception 362, and virtual machine execution is exited with the select interception code 364. Thereafter, the hypervisor resolves the prefix pages 366 and the virtual machine is re-dispatched by the hypervisor 368.

In one example, returning to FIG. 3A, based on re-dispatching the virtual machine, a determination is made (e.g., by the trusted entity) as to whether the virtual machine was locked for an exception 370. If the virtual machine was not locked for an exception, then processing continues with executing guest instructions 306. However, if the virtual machine was locked for an exception, then the saved program exception from prior to the select interception exit is presented (e.g., by the trusted entity) to the operating system, which handles it as it normally does 372. Processing may continue, for instance, with interrupt requires prefix access 332.

Although in the above example, the virtual machine is a secure virtual machine, in other embodiments, one or more aspects may apply to a non-secure virtual machine.

In accordance with one or more aspects of the present invention, prefix page checking and processing are performed during execution of a virtual machine (e.g., a secure virtual machine). Access by a virtual machine to the prefix pages (or other select area of memory used for communication between the virtual machine and operating system) may be explicit or implicit. The explicit access to the prefix pages during guest execution is handled like other memory accesses. For instance, the virtual machine accesses the prefix pages as real memory and a host program exception is reported if a page cannot be accessed. Implicit accesses are more difficult to manage since they can occur at any time during guest dispatch. During the implicit access of these pages, the trusted entity (e.g., ultravisor) tests the accessibility of the pages. If they are inaccessible, the ultravisor checks the reason for the implicit access. Depending on the reason, the ultravisor decides whether to back-out from the guest unit-of-operation (e.g., nullify the instruction), or to capture the state of the virtual machine and save it in secure ultravisor storage and lock the virtual machine before exiting to the host (e.g., hypervisor) with a select interception code (e.g., 112) that indicates to the hypervisor that a guest prefix page is inaccessible. After exit from the virtual machine, the hypervisor makes the page or pages accessible to the guest and re-dispatches the guest. The trusted entity during execution of the re-dispatch of the virtual machine (e.g., start interpretive execution) checks whether the virtual machine is locked, and if so, presents the interruption saved as part of the guest state prior to exit with the select interception code. This interruption is then processed by the operating system and eventually guest execution is resumed.

In one or more aspects, a capability is provided to handle the case when a prefix page of a virtual machine is determined to be inaccessible when accessed during its execution. A trusted entity (e.g., ultravisor) is used to save the state of the virtual machine including a pending interruption, if applicable, at the time when the prefix is not accessible and inform the hypervisor through the select interception code that the prefix is no longer accessible. In one example, the hypervisor then converts the prefix pages from non-secure to secure and dispatches the virtual machine again. As another example, the hypervisor maps the guest prefix pages in hypervisor virtual storage. During execution of the start virtual machine, the ultravisor then checks the prefix accessibility and completes the work that the virtual machine was supposed to do prior to the select interception code exit.

In one or more aspects, a select interception code (e.g., 112) occurs while the guest is at a non-interruptible point. For example, if a guest encounters a completion type exception (e.g., overflow, program event recording, etc.), the guest updates the guest storage and/or guest register. The guest, however, in one example, cannot present the interrupt since its prefix is inaccessible and cannot just simply exit out to the hypervisor. Thus, the trusted entity, in this case, saves information pertaining to the program exception in secure storage, locks the guest and exits. Other examples in which the guest cannot simply exit when the prefix is inaccessible and thus, the trusted entity performs certain actions is at a transaction abnormal termination and for run-time instrumentation samples. Other examples may also exist.

One or more aspects of the present invention are inextricably tied to computer technology and facilitate processing within a computer, improving performance thereof. Processing is facilitated by managing prefix page access by virtual machines (e.g., secure virtual machines) while maintaining security and improving performance.

Further details of one embodiment of facilitating processing within a computing environment, as it relates to one or more aspects of the present invention, are described with reference to FIGS. 4A-4C.

Referring to FIG. 4A, in one embodiment, a determination is made, based on dispatch of a virtual machine, of whether a select area of memory expected to be accessible to the virtual machine and used in communication between the virtual machine and an operating system is accessible to the virtual machine 400. Based on determining that the select area of memory is inaccessible to the virtual machine, virtual machine execution is exited with a select interception code 402.

This facilitates processing by preventing guest instruction execution if the select area of memory, expected to be accessible, is inaccessible. One or more aspects handle a situation in which the hypervisor can no longer keep the select area of memory (e.g., prefix page(s)) of a guest (e.g., a virtual machine) pinned for the duration of guest execution.

Further, in one example, based on determining that the select area of memory is accessible to the virtual machine, one or more guest instructions of the virtual machine are executed 404.

In one example, based on determining that the select area of memory is accessible, a determination is made for a guest instruction of the virtual machine whether there is to be access to the select area of memory 406. Based on determining that there is to be access, a check is made as to whether the access is an explicit access or an implicit access 408. Based on whether the access is the explicit access or the implicit access, one or more actions are performed 410.

The select area of memory, expected to be accessible, is once again checked for accessibility to facilitate processing.

As an example, based on the access being the implicit access 412, the one or more actions include, for instance, determining a reason for the implicit access 414 and performing one or more select actions, based on the reason for the implicit access 416.

In one example, referring to FIG. 4B, based on the reason for the implicit access being an asynchronous interrupt 420, the one or more select actions include, for instance, performing a pre-test of the select area of memory 422 and determining whether an exception occurred during the pre-test of the select area of memory 424. As an example, based on determining that the exception occurred during the pre-test of the select area of memory, the asynchronous interrupt is kept pending in the virtual machine and there is an exit to a host of the virtual machine with the select interception code 426.

In one example, based on the reason for the implicit access being a program interrupt 430, the one or more select actions include, for instance, determining whether the program interrupt is to access the select area of memory 432 and performing a pre-test of the select area of memory, based on determining that the program interrupt is to access the select area of memory 434. A determination is made, in one example, as to whether an exception occurred during the pre-test of the select area of memory 436, and processing is performed based on whether the exception occurred during the pre-test of the select area of memory 438.

In one example, referring to FIG. 4C, the performing processing includes continuing with instruction processing, based on determining that the exception did not occur during the pre-test of the select area of memory 440. Further, in another example, based on determining that the exception did occur during the pre-test of the select area of memory, the performing processing includes checking whether the guest instruction is executed as part of transactional execution 442. Based on the checking indicating that the guest instruction is executed as part of transactional execution, in one example, virtual machine execution is exited with the select interception code and transactional execution is abnormally terminated 444. Further, in one example, based on the checking indicating that the guest instruction is not executed as part of transactional execution, a type of the exception is determined, and one or more chosen actions are performed based on the type of the exception 446.

As an example, based on the type of exception being a nullifying or suppression exception, the one or more chosen actions include nullifying the guest instruction 448. Further, in one example, based on the type of exception being a completion or early specification exception 450, the one or more chosen actions include saving interrupt information in a secure location 452, locking the virtual machine for exception 454, and exiting virtual machine execution with the select interception code 456.

In one example, a lock of the virtual machine is examined at a next entry of the virtual machine 458, and program exception handling is completed based on the lock being set via the locking 460.

Processing is facilitated by determining a cause/condition of an exit and performing actions based thereon.

Other variations and embodiments are possible.

Figure 5A:
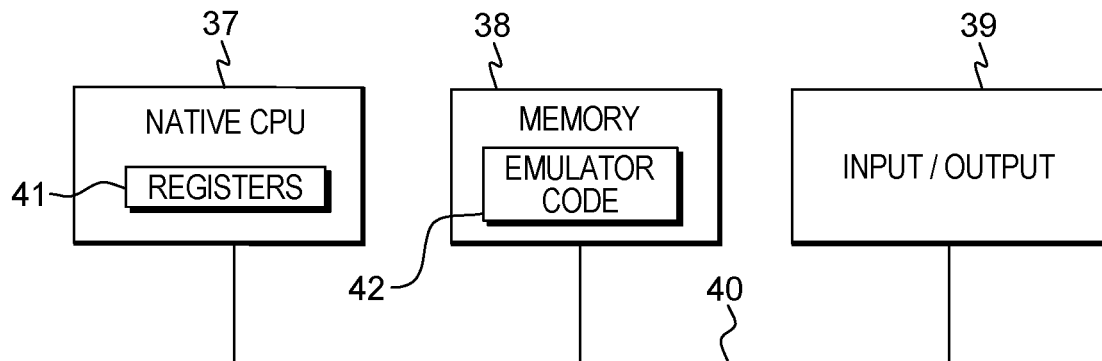
FIG. 5A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 5A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 5B:
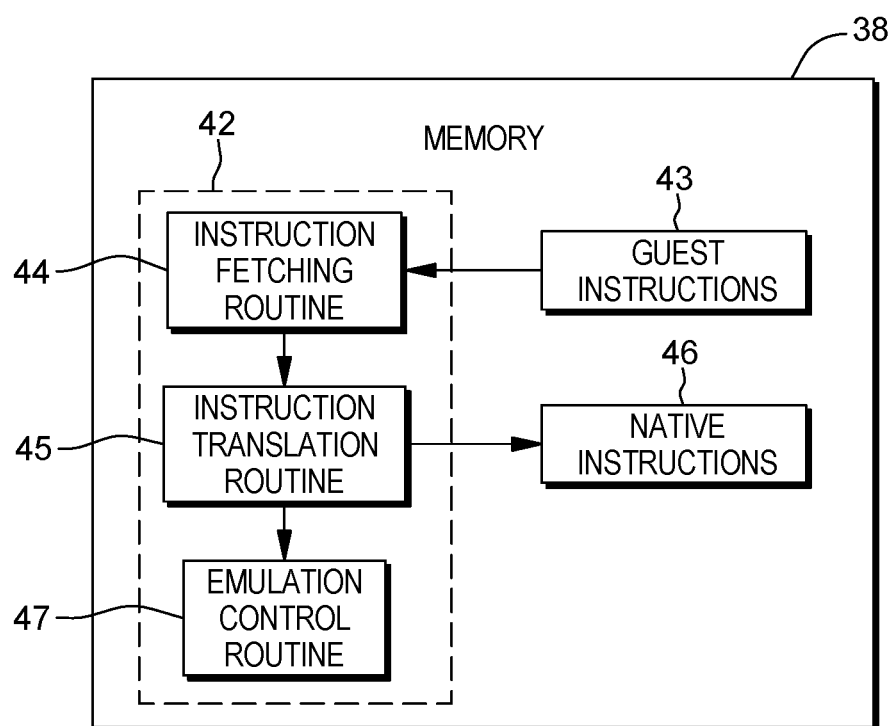
FIG. 5B depicts further details of the memory of FIG. 5A, in accordance with one or more aspects of the present invention.

Further details relating to emulator code 42 are described with reference to FIG. 5B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction that may be emulated includes the guest instructions described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
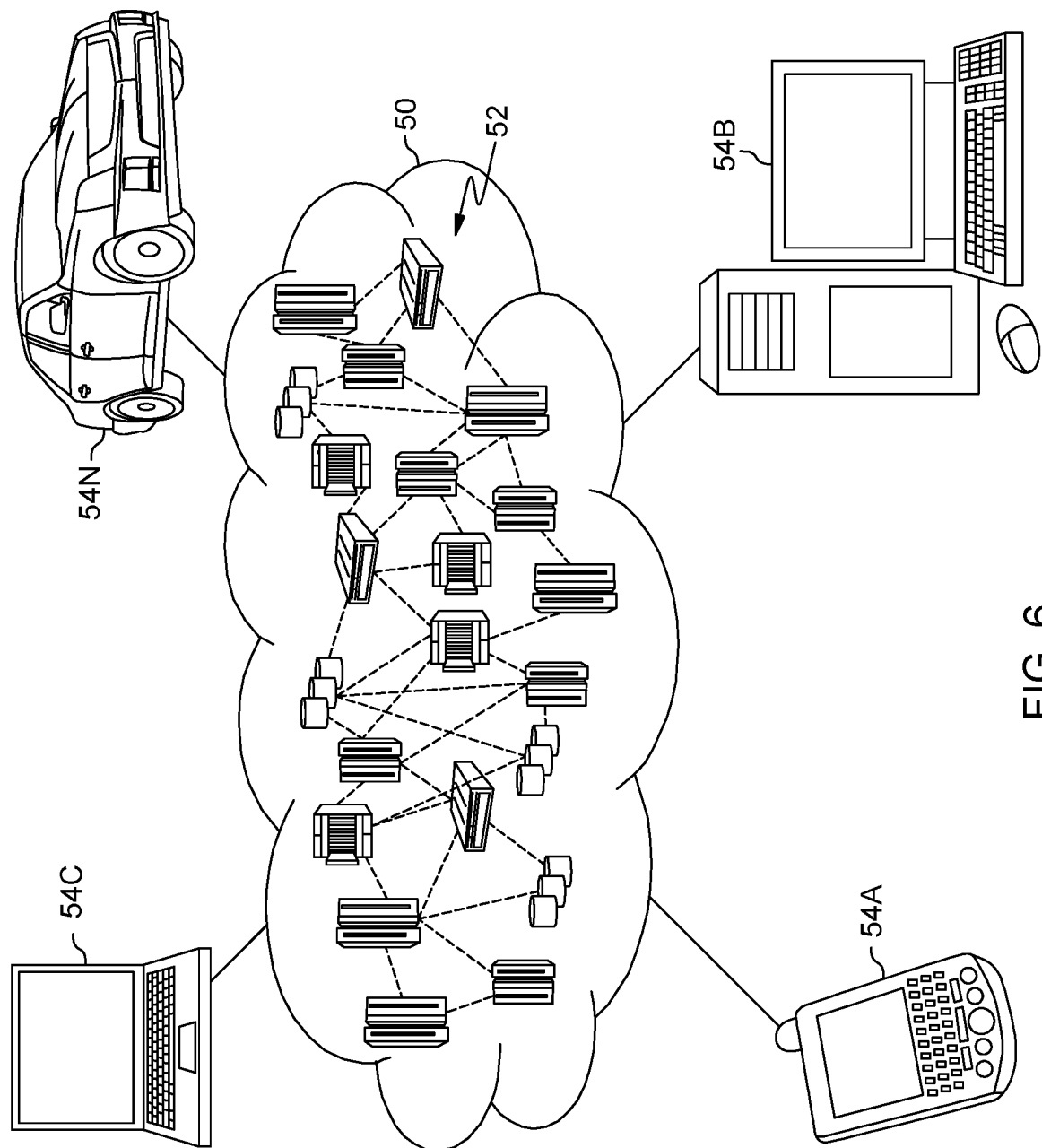
FIG. 6 depicts one embodiment of a cloud computing environment, in accordance with one or more aspects of the present invention.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
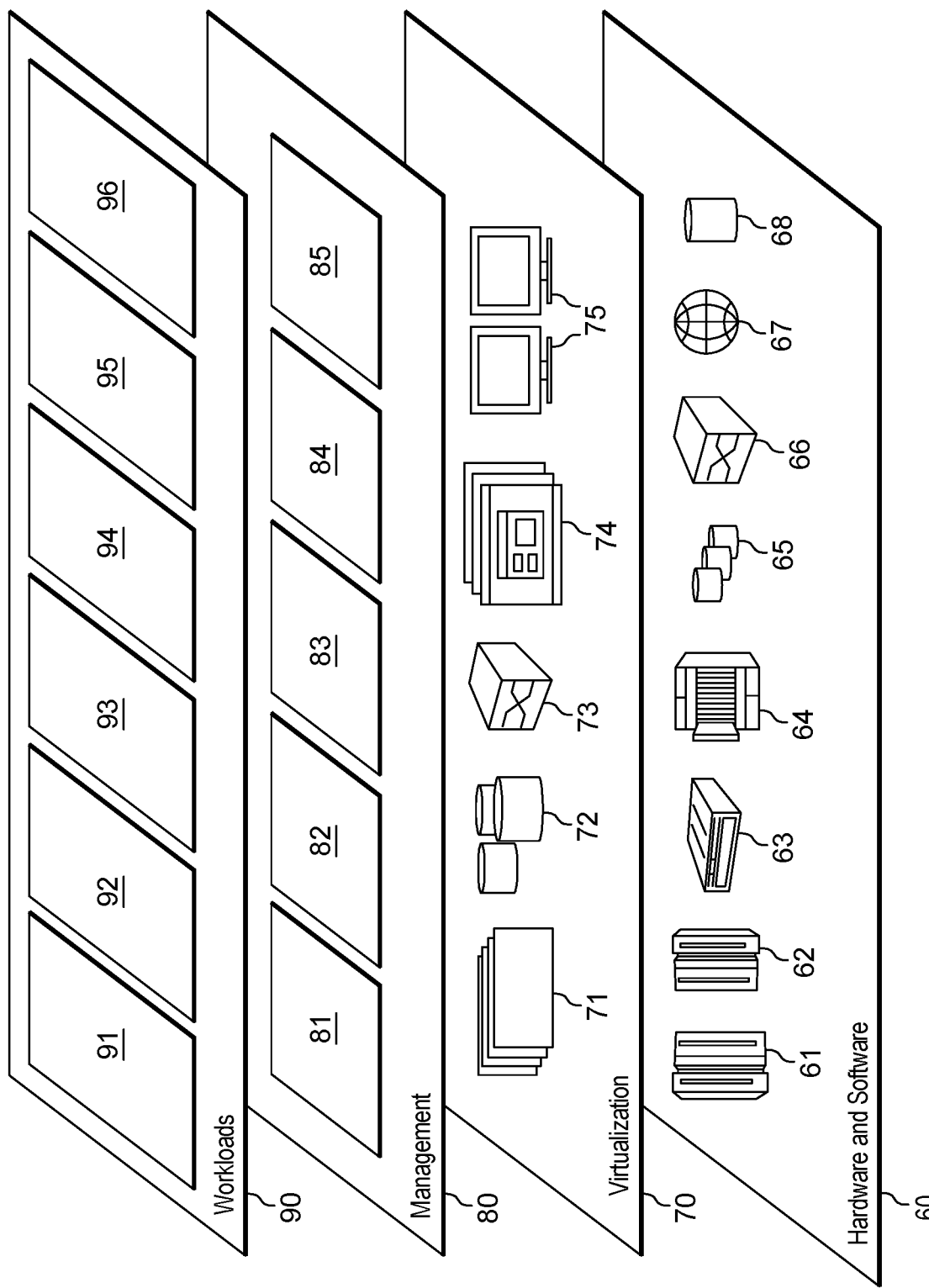
FIG. 7 depicts one example of abstraction model layers, in accordance with one or more aspects of the present invention.

Referring now to FIG. 7 a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing select area of memory (e.g., prefix page) processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions, calls and/or operations may be used. Additionally, different actions may be performed. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
one or more computer readable storage media and program instructions collectively stored on the one or more computer readable storage media that when executed perform a method comprising:
executing a virtual machine within a computing environment, the virtual machine to have access to a select area of memory within the computing environment, the select area of memory used in communication between the virtual machine and an operating system within the computing environment;
executing, by the virtual machine, a guest instruction of the virtual machine based on the select area of memory being accessible, wherein based on executing the guest instruction, the select area of memory is to be accessed as an implicit access, wherein the implicit access of the select area of memory occurs due to a condition occurring outside a scope of instruction execution of the virtual machine; and
exiting execution of the virtual machine with a select interception code based on, at least, an occurrence of an exception during a pre-test of accessibility of the select area of memory for the guest instruction during the implicit access.

2. The computer program product of claim 1, wherein the method further comprises executing one or more guest instructions of the virtual machine, based on an indication that the select area of memory is accessible to the virtual machine, the one or more guest instructions including the guest instruction.

3. The computer program product of claim 1, wherein the select area of memory is to be implicitly accessed, based on an indication that the select area of memory is to be accessed for the guest instruction and that the access is not explicit, wherein an explicit access occurs due to execution of a particular instruction.

4. The computer program product of claim 1, wherein the pre-test of accessibility of the select area of memory to be accessed is performed based on a reason for the implicit access being a particular type of reason.

5. The computer program product of claim 4, wherein the particular type of reason for the implicit access is an asynchronous interrupt, and wherein the asynchronous interrupt is kept pending in the virtual machine, based on the pre-test indicating that the exception occurred during the pre-test of the select area of memory to be accessed.

6. The computer program product of claim 4, wherein the particular type of reason for the implicit access is a program interrupt, and wherein the pre-test of accessibility of the select area of memory to be accessed is performed, based on an indication that the program interrupt is to access the select area of memory.

7. The computer program product of claim 6, wherein the exiting execution of the virtual machine includes exiting execution of the virtual machine with the select interception code based on the exception and an indication that the guest instruction is executing as part of transactional execution, and wherein the transactional execution is abnormally terminated.

8. The computer program product of claim 6, wherein based on the pre-test of accessibility of the select area of memory indicating that the exception occurred and based on an indication that the guest instruction is not executed as part of transactional execution, the method further comprises performing one or more chosen actions based on a type of the exception.

9. The computer program product of claim 8, wherein based on the type of exception being a nullifying exception, the one or more chosen actions include nullifying the guest instruction.

10. The computer program product of claim 8, wherein based on the type of exception being a completion exception, the one or more chosen actions include:
saving interrupt information in a secure location; and
locking the virtual machine for exception.

11. The computer program product of claim 10, wherein the method further comprises:
completing program exception handling based on a lock being set at a next entry of the virtual machine.

12. The computer program product of claim 8, wherein based on the type of exception being a suppression exception, the one or more chosen actions include nullifying the guest instruction.

13. The computer program product of claim 8, wherein based on the type of exception being an early specification exception, the one or more chosen actions include:
saving interrupt information in a secure location; and
locking the virtual machine for exception.

14. A computer system comprising:
a memory; and
at least one processor in communication with the memory, wherein the computer system is configured to perform a method, said method comprising:
executing a virtual machine within the computing environment, the virtual machine to have access to a select area of memory within the computing environment, the select area of memory used in communication between the virtual machine and an operating system within the computing environment;
executing, by the virtual machine, a guest instruction of the virtual machine based on the select area of memory being accessible, wherein based on executing the guest instruction, the select area of memory is to be accessed as an implicit access, wherein the implicit access of the select area of memory occurs due to a condition occurring outside a scope of instruction execution of the virtual machine; and
exiting execution of the virtual machine with a select interception code based on, at least, an occurrence of an exception during a pre-test of accessibility of the select area of memory for the guest instruction during the implicit access.

15. The computer system of claim 14, wherein the select area of memory is to be implicitly accessed, based on an indication that the select area of memory is to be accessed for the guest instruction and that the access is not explicit, wherein an explicit access occurs due to execution of a particular instruction.

16. The computer system of claim 14, wherein the pre-test of accessibility of the select area of memory to be accessed is performed based on a reason for the implicit access being a particular type of reason, wherein the particular type of reason for the implicit access is an asynchronous interrupt, and wherein the asynchronous interrupt is kept pending in the virtual machine, based on the pre-test indicating that the exception occurred during the pre-test of the select area of memory to be accessed.

17. The computer system of claim 14, wherein the pre-test of accessibility of the select area of memory to be accessed is performed based on a reason for the implicit access being a particular type of reason, wherein the particular type of reason for the implicit access is a program interrupt, and wherein the pre-test of accessibility of the select area of memory to be accessed is performed, based on an indication that the program interrupt is to access the select area of memory.

18. A computer-implemented method comprising:
executing a virtual machine within a computing environment, the virtual machine to have access to a select area of memory within the computing environment, the select area of memory used in communication between the virtual machine and an operating system within the computing environment;
executing, by the virtual machine, a guest instruction of the virtual machine based on the select area of memory being accessible, wherein based on executing the guest instruction, the select area of memory is to be accessed as an implicit access, wherein the implicit access of the select area of memory occurs due to a condition occurring outside a scope of instruction execution of the virtual machine; and
exiting execution of the virtual machine with a select interception code based on, at least, an occurrence of an exception during a pre-test of accessibility of the select area of memory for the guest instruction during the implicit access.

19. The computer-implemented method of claim 18, wherein the select area of memory is to be implicitly accessed, based on an indication that the select area of memory is to be accessed for the guest instruction and that the access is not explicit, wherein an explicit access occurs due to execution of a particular instruction.

20. The computer-implemented method of claim 18, wherein the pre-test of accessibility of the select area of memory to be accessed is performed based on a reason for the implicit access being a particular type of reason, wherein the particular type of reason for the implicit access is an asynchronous interrupt, and wherein the asynchronous interrupt is kept pending in the virtual machine, based on the pre-test indicating that the exception occurred during the pre-test of the select area of memory to be accessed.

21. The computer-implemented method of claim 18, wherein the pre-test of accessibility of the select area of memory to be accessed is performed based on a reason for the implicit access being a particular type of reason, wherein the particular type of reason for the implicit access is a program interrupt, and wherein the pre-test of accessibility of the select area of memory to be accessed is performed, based on an indication that the program interrupt is to access the select area of memory.

22. The computer-implemented method of claim 18, wherein the exiting execution of the virtual machine includes exiting execution of the virtual machine with the select interception code based on the exception and based on an indication that the guest instruction is executing as part of transactional execution, wherein the transactional execution is abnormally terminated.

23. A computer program product comprising:
one or more computer readable storage media and program instructions collectively stored on the one or more computer readable storage media that when executed perform a method comprising:

executing, by a trusted execution environment within a computing environment, a start virtual machine instruction to start execution of a virtual machine within the computing environment, the virtual machine to have access to a select area of memory within the computing environment, the select area of memory used in communication between the virtual machine and an operating system within the computing environment; and controlling, by the trusted execution environment, execution of the virtual machine, wherein based on an implicit access of the select area of memory during guest instruction execution of the virtual machine, the controlling execution of the virtual machine includes exiting execution of the virtual machine with a select interception code, based on the select area of memory expected to be accessible to the virtual machine being inaccessible to the virtual machine, wherein the select area of memory is inaccessible to the virtual machine based on an exception occurring during a pre-test of accessibility of the select area of memory during the implicit access, and wherein the implicit access of the select area of memory occurs due to a condition occurring outside a scope of instruction execution of the virtual machine.

24. A computer program product comprising:

one or more computer readable storage media and program instructions collectively stored on the one or more computer readable storage media that when executed perform a method comprising:

executing a start virtual machine instruction within a computing environment to start execution of a virtual machine, the virtual machine to have access to a select area of memory within the computing environment;

and exiting, based on an implicit access of the select area of memory during guest instruction execution of the virtual machine, execution of the virtual machine with a select interception code, based on the select area of memory being inaccessible to the virtual machine, wherein the select area of memory is inaccessible to the virtual machine based on an exception occurring during a pre-test of accessibility of the select area of memory during the implicit access, and wherein the implicit access of the select area of memory occurs due to a condition occurring outside a scope of instruction execution of the virtual machine.

25. The computer program product of claim 24, wherein the select area of memory includes one or more prefix pages used in communication with an operating system of the computing environment.

* * * * *